Patented Mar. 19, 1935

1,994,499

UNITED STATES PATENT OFFICE 1,994,499

ENGRAVER'S ETCHING ACID OF INCREASED EFFICIENCY

Ernest R. Boller, Cleveland Heights, Ohio, assignor to The Grasselli Chemical Company, Cleveland, Ohio, a corporation of Delaware No Drawing. Application December 31, 1932, Serial No. 649,731

4 Claims. (Cl. 41—42)

The present invention refers to engraver's etching acid of increased efficiency and consists in an etching acid comprising nitric acid and a small amount of a certain metal dissolved in said acid, namely copper, silver or platinum, and its use in etching zinc plates.

In the photoengraving art, as at present generally practiced, the etching process may be described essentially as follows: A highly polished zinc plate is coated with a thin layer of an acid resisting enamel, such as glue or shellac, sensitized to light with ammonium chromate, or with a layer of albumin similarly sensitized. The zinc plate thus sensitized is placed back of a glass plate bearing an opaque-translucent mirror-image-negative film of the picture or design being reproduced, and exposed to a strong light. Where the light strikes the sensitized zinc surface the enamel or albumin is fixed to the surface of the zinc, developing on the zinc a mirror-image-positive of the design being reproduced. In the case of the enamel coating, the unfixed portions of the layer are washed off with water and the zinc plate is ready for etching. In the case of the albumin coating, the plate is covered with a thin layer of ink and the unfixed part of the albumin with overlying ink washed off the plate with water. The ink remaining on the plate is dusted with an acid resisting resin and the latter burned in by heating the plate to the resin's melting point, after which the plate is ready for etching.

The zinc plates to be etched thus have those parts which are to print black covered with an acid resisting coating and the other parts exposed. Those parts of the plate which are protected will hereinafter be referred to as the tops, and the exposed parts as bottoms.

The etching process itself consists essentially of exposing the plate prepared as described to a nitric acid solution, taking a suitable procedure to prevent the acid attacking the edges of the tops. This operation is commonly performed by placing the plate vertically in a closed tank and splashing or throwing the acid solution against the plate by means of a paddle arrangement. It is the general practice to use an etching bath containing approximately 10% $HNO_3$.

When etching of the zinc plate has proceeded sufficiently far that the bottoms have a noticeable depth, the plate is rinsed, dried and the exposed edges protected against attack by brushing a bank of acid resisting resin against them and fusing this in place by heating the plate to the required temperature. The etching is continued until the edges are again in danger of being undercut, whereupon they are again banked with the acid resisting resin. This procedure is continued until the desired depth is obtained which, of course, varies with the type of reproduction, area of the bottoms and so on.

In this procedure it is essential that the bottoms of the plate be quite smooth. Otherwise the irregularities in the surface will catch the acid resisting resin and in the course of the operation build up still larger irregularities, which will interfere with printing from the plate. This coating of resin on the bottoms slows up the operation very considerably. Even on very smooth bottoms there is some such coating, and this must be removed before the actual solution of the zinc underneath can proceed. However, if the acid removes the resin too easily, it will naturally attack the banks on the edges, and lead to undercutting before appreciable depth can be obtained.

It is equally essential that there be no undercutting of the edges. This is especially true of the work in newspaper plants where paper mattes are made from the engravings for the casting of cylindrical type.

The acid etching bath is used until its action becomes unsatisfactorily slow, as usually evidenced by its inability to remove the thin film of resin from the bottoms. This point is commonly reached when the nitric acid concentration has fallen to approximately 5%. It is well known that addition of concentrated acid to a spent bath does not revivify it appreciably; hence, about one-half of the nitric acid required by the industry must be thrown away.

I have found that dilute nitric acid containing small amounts of copper, silver or platinum, in the form of their soluble salts, increases very materially the efficiency of the etching acid without sacrificing any of the essential features of the acid baths consisting of dilute nitric acid used up to the present time.

By efficiency of the bath I mean the amount of zinc which a given quantity of nitric acid at a specified concentration will dissolve at or above a fixed rate of solution, the rate at which it is general practice to discard the bath. A liter of straight 10% nitric acid kept at about 40° C. will dissolve about 17 grams of zinc after which its rate of dissolving zinc is so slow that it cannot be used further for etching zinc plates and is commonly discarded; its efficiency is rated at 17 grams per liter.

The presence in the engraver's nitric acid of small amounts of copper, silver or platinum increases this efficiency. The amounts of metals contemplated in my novel engraver's acids are not very critical; they range from less than about 0.1 to about 2%, calculated on the amount of HNO₃ contained in the bath. While larger amounts could be used, they have a tendency to interfere with the action of the acid and for commercial operations with the usual zinc plates I prefer to use nitric acids containing the metal within the above limits.

Within this concentration range the increase in the etching efficiency conferred upon the acid by the copper, for instance, is proportional to the concentration of the metal. This is illustrated in the following table:

| Parts Cu per 100 parts HNO₃ | Rated efficiency | Acid concentration in bath when discarded |
|---|---|---|
| 0.000 | 17.0 | 5.0% HNO₃ |
| 0.167 | 21.4 | 4.0% HNO₃ |
| 0.333 | 23.5 | 3.5% HNO₃ |
| 0.50 | 25.5 | 3.2% HNO₃ |

The rated efficiency, as defined above, is the grams of zinc dissolved by one liter of 10% nitric acid containing the indicated amounts of copper at 40° C. at a rate higher than the critical rate. The acid concentration in bath when discarded, i. e. when its rate of solution of zinc falls below the critical rate, gives a measure of the proportion of nitric acid which cannot be utilized.

The concentration of the metal which can be advantageously employed in the bath depends to some extent upon the character of the zinc plate to be etched. In general I have found the optimum concentration to be between 0.167 and 0.333 parts of the metal per 100 parts HNO₃.

The effect of silver and platinum upon the efficiency of a nitric acid etching bath is entirely similar to that of copper and the same relations between concentration and efficiency obtain. The price of platinum makes this metal, however, hardly practical for commercial uses; and silver has the disadvantage that it is precipitated by the chlorine contained in technical nitric acid and the ordinary tap water used to prepare the etching baths. For these reasons I prefer copper for commercial applications of my novel etching baths.

The presence of the small amount of copper in my novel etching baths does not impair any of the essential requirements of such baths. The bottoms of the engravings from such a bath are quite as smooth as those from a bath of straight nitric acid. There is no greater tendency to undercut the edges.

In preparing my novel etching baths I conveniently dissolve a copper compound in concentrated, commercial nitric acid, for instance 40° Bé. acid of high quality, and dilute this acid with water to the desired strength. I can dissolve metallic copper in the acid, but I prefer to add the copper in the form of a compound, the acid constituent of which will not interfere appreciably with the action of the bath, as for instance the nitrate, carbonate, oxide, sulfate, etc.

The presence of the copper in the bath increases the rate of solution of the zinc, and hence the rate of etching, but not to such an extent as to interfere seriously with the present established methods of procedure. In many instances this increased speed is a decided advantage.

Although it will be understood that the invention is susceptible to many variations in practice, especially with regard to the concentration of copper employed and the form and manner in which it is introduced into the bath, the following example will demonstrate the preferred procedure and the advantages to be derived therefrom.

Example 1.—To 40° Bé. commercial nitric acid of good quality was added 0.1% copper as copper sulfate. This copper-containing acid was diluted with tap water to a concentration of 10% by weight. A piece of standard engraver's zinc plate, coated on back and edges with acid resisting paint, was exposed to this dilute acid in a splash tub of the character described above. The rate of solution was measured by weighing the zinc after definite periods of exposure. One liter of the dilute copper-containing acid dissolved 21.4 grams of the zinc at a rate above the critical rate defined above. With the same acid without the copper, one liter of 10% acid dissolved under identical conditions only 17.3 grams of zinc at a rate above the critical rate.

A zinc plate carrying a design developed by the method previously described was etched in a bath prepared by diluting to 10% HNO₃ a 40° Bé nitric acid containing 0.1% copper as copper sulfate, using the standard procedure of the art. The bottoms were smooth, and there was no undercutting of the edges. Greater depth of the bottoms was obtained than are given by a bath consisting only of a nitric acid solution, and in less time.

I claim:

1. A process of etching a zinc plate which comprises treating the prepared plate with a dilute nitric acid containing a minor amount of a metal of the group of metals consisting of copper, silver and platinum, dissolved therein.

2. A process of etching a zinc plate which comprises treating the prepared plate with a dilute nitric acid containing from about 0.1 to 2 parts of a metal per 100 parts of HNO₃ dissolved therein, said metal being chosen from the group of metals consisting of copper, silver and platinum.

3. A process of etching a zinc plate which comprises treating the prepared plate with a dilute nitric acid containing a minor amount of copper dissolved therein.

4. A process of etching a zinc plate which comprises treating the prepared plate with a dilute nitric acid containing from about 0.1 to 2 parts of copper per 100 parts of HNO₃ dissolved therein.

ERNEST R. BOLLER.